Feb. 23, 1943.   A. LONGACRE   2,312,106
HYDROMETER
Filed May 23, 1940
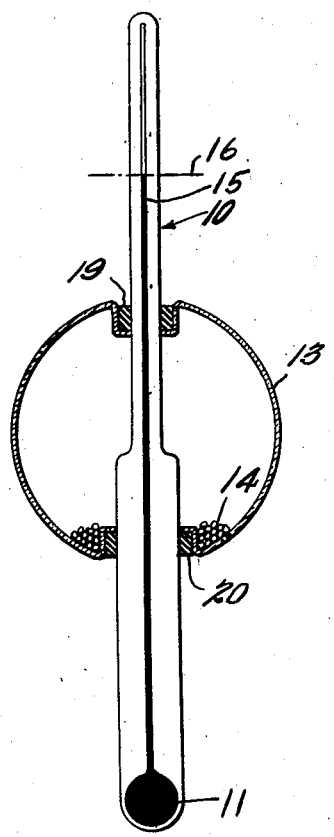
Inventor
Andrew Longacre
By Watson, Cole, Grindle & Watson
Attorney Patented Feb. 23, 1943

2,312,106

UNITED STATES PATENT OFFICE 2,312,106

HYDROMETER

Andrew Longacre, Exeter, N. H.

Application May 23, 1940, Serial No. 336,848

1 Claim. (Cl. 265—46)

The present invention relates to hydrometers and particularly to a specialized type of hydrometer adapted for use in testing particular liquids and for indicating when, in the course of treatment, the liquid under test has reached a desired condition with respect to what may be called its "relative specific gravity." As hereinafter employed, the term "relative specific gravity" is intended to signify that specific gravity which the liquid under test would have if its temperature were raised or lowered to a standard value, and the device of the present invention is adapted to give a suitable indication when the liquid undergoing treatment reaches the desired relative specific gravity, regardless of the temperature of the liquid and its actual specific gravity at the time of test.

The device of the present invention consists essentially in a thermometer having a hollow bulb or other buoyant member associated therewith for floating it in the liquid to be tested, the total weight and dimensions of the device being so chosen with regard to the coefficient of expansion of the liquid under test that the indicator of the thermometer will bear a predetermined relation to the level of said liquid when the relative specific gravity of the latter reaches the predetermined desired value. Such a device will be useful in many processes in which a liquid undergoes treatment for the purpose of bringing it to a desired specific gravity, an example of one such process being the boiling of sugar maple sap to make maple syrup.

In the manufacture of maple syrup, it is desirable to boil the sap until its specific gravity is increased to such an extent that the liquid would have a specific gravity of 36° Baumé at 68° F. It is obviously impractical to discontinue the boiling of the sap at intervals and permit it to reach a temperature of 68° F. for the purpose of testing its specific gravity. On the other hand, the practice of testing the specific gravity of the sap while it is boiling, and correcting the reading according to the difference in temperature between 68° F. and the temperature of the liquid, is attended with some difficulty due to the calculations involved, which it is desirable to eliminate. The device of the present invention is adapted to indicate when the desired condition is reached, regardless of the then temperature of the sap, and without the necessity of making any calculations or even reading a scale. The instrument may be provided with a scale or scales if desired, but none is required.

Another feature of the present invention resides in the fact that the latter may be adjusted for different liquids and for different end-points, by adjusting the weight of the device, its volume, or both.

Other and further objects, features and advantages of the present invention will be apparent to one skilled in the art from the following description taken in connection with the accompanying drawing, which illustrates, in vertical section, one embodiment of the invention.

In order to facilitate an understanding of the invention, reference is made to the embodiment thereof shown in the accompanying drawing and detailed descriptive language is employed. It will nevertheless be understood that no limitation of the invention is thereby intended and that various changes and alterations are contemplated such as would ordinarily occur to one skilled in the art to which the invention relates.

Referring to the drawing, the device there illustrated comprises a thermometer 10 of the liquid column type, having the usual bulb 11, the thermometer being of larger diameter in its lower portion than in its upper portion. Surrounding the mid portion of the thermometer, is a buoyant member 13 comprising a hollow structure of glass or other suitable material. It is desirable that the buoyant member 13 be made of material having a relatively low coefficient of expansion, so that it will be unnecessary to correct or adjust the instrument for this factor, in order to make it accurate within acceptable limits. Since the total weight of the device must be related to its volume, it may be necessary to introduce weight in the form of lead shot or the like, as indicated at 14.

The device is adapted to indicate that the liquid under test has reached the desired condition by the position of the upper end of the column 15 of thermometric liquid, relative to the level of the liquid under test, which is indicated at 16. Any desired predetermined relation may be chosen, but in the illustrated embodiment, the characteristics of the device have been determined in such a manner that the desired condition of the liquid under test will be indicated when the top of the liquid column 15 is just even with the liquid level 16.

The buoyant member 13 is mounted on the thermometer 10 in such a way as to be adjustable longitudinally thereof, and the latter has its upper and lower portions of different diameters, so that the total volume of the device may be varied, without changing its total weight, by adjusting the buoyant member 13 longitudinally of the thermometer. The buoyant member is sealed against the entry of liquid by means of gaskets 19, 20, of rubber or other suitable material. This construction possesses the additional advantage that the weight thereof may be easily adjusted or varied by adding or subtracting lead shot or other suitable material, to or from the supply indicated at 14, it being only necessary to partially withdraw the thermometer from the buoyant member in order to add or remove the shot through the upper aperture in the buoyant member.

The principle upon which the present invention operates may be illustrated in the following manner, assuming that W = total weight of instrument
A = cross sectional area of that part of the thermometer stem above the buoyant member
$t_0$ = temperature indicated by reference line on thermometer (for example 0° C.)
$S_0$ = specific gravity of liquid under test at $t_0$
$V_0$ = volume of instrument up to the reference line $t_0$
$t_1$ = temperature indicated by a second reference line on the thermometer
$S_1$ = specific gravity of the liquid under test at $t_1$
$V_1$ = volume of instrument up to reference line $t_1$
$a$ = coefficient of expansion of liquid under test
L = length on thermometer stem between $t_0$ and $t_1$ By the fundamental principle of a hydrometer, $$W = V_0 S_0 = V_1 S_1 \tag{1}$$

For a stem of uniform cross-section (above the buoyant member)

$$V_1 = V_0 + LA \tag{2}$$

The expansion of the liquid displaced by the instrument may be expressed by the equation, $$V_1 = V_0 + a V_0 (t_1 - t_0) \tag{3}$$

Combining equations (2) and (3)

$$LA = a V_0 (t_1 - t_0)$$

or $$V_0 = \frac{AL}{a(t_1 - t_0)} \tag{4}$$

Since L is proportional to $(t_1 - t_0)$ and is determined by the dimensions of the thermometer, and since $a$ is determined by the liquid for which the instrument is to be used, Equation 4 establishes the relation between $V_0$ and A. $V_0$ being thus established, W is determined from Equation 1.

To demonstrate that the instrument is suitable for all temperatures, assume that $t$ = some temperature other than $t_1$ or $t_0$
S = specific gravity of the liquid at the temperature $t$
V = volume of the device appropriate for S
$h$ = length of thermometer stem corresponding to $(t - t_0)$
$h'$ = length of thermometer stem corresponding to $(V - V_0)$ Thus, the problem is to show that $h'$ equals $h$, which may be done as follows. Evaluating $h$, $$h = \frac{t - t_0}{t_1 - t_0} L \tag{5}$$

Evaluating $h'$, by Equations 2 and 3, $$V = V_0 + A h' = V_0 + a V_0 (t - t_0),$$

or $$h' = \frac{a V_0}{A}(t - t_0) \tag{6}$$

Combining (6) and (4), $$h' = \frac{L}{(t_1 - t_0)}(t - t_0) \tag{7}$$

By Equations 5 and 7, $$h = h'$$

In the foregoing calculations, the expansion of the material of the instrument has been disregarded, as has also the effect of the barometric pressure, and a constant coefficient of expansion of the thermometric liquid has been assumed. For practical purposes, these variants may be disregarded without affecting the accuracy of the instrument within acceptable limits, or, should greater accuracy be required, corrections can be made in both the theory and practice to allow for these.

It is desirable, but not essential, to construct the instrument so that the thermometer bulb and stem shall be exposed directly to the liquid under test, above and below the buoyant member, in order that the thermometer may have a quick response.

While the foregoing description is based upon the use of a thermometer of the liquid column type, it is obvious that any other suitable type of thermometer may be used, provided the movements of the pointer or other indicator thereof are correlated with the other factors of the device in accordance with the theory set out above.

Having thus described the invention, what is claimed as new and desired to be secured by Letters Patent is:

In a specific gravity indicating device, a thermometer and a buoyant member associated with said thermometer for floating the latter in the liquid under test, the total weight and dimensions of said device being so chosen with regard to the coefficient of expansion of the liquid under test that the indicator of the thermometer will bear a predetermined relation to the level of said liquid when the relative specific gravity of said liquid reaches a predetermined desired value, regardless of the temperature of said liquid at the time of testing, said buoyant member being mounted for movement relative to said thermometer and constituting therewith an instrument of variable volume, capable of adjustment for use with liquids of different specific gravities, said buoyant member comprising a hollow structure having opposed apertures for reception of the stem portion of said thermometer, and sealing means between said buoyant member and said thermometer to prevent the entry of liquid through said apertures, those portions of said thermometer extending through said respective apertures being of different diameters, whereby the volume of said device may be altered by adjusting said thermometer relative to said buoyant member.

ANDREW LONGACRE.